(12) United States Patent
Yen

(10) Patent No.: US 7,880,984 B2
(45) Date of Patent: Feb. 1, 2011

(54) LENS MODULE

(75) Inventor: Shih-Chieh Yen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/649,529

(22) Filed: Dec. 30, 2009

(65) Prior Publication Data

US 2010/0328789 A1 Dec. 30, 2010

(30) Foreign Application Priority Data

Jun. 25, 2009 (CN) .................. 2009 1 0303687

(51) Int. Cl.
 *G02B 7/02* (2006.01)
(52) U.S. Cl. .................. 359/822; 359/811; 359/819
(58) Field of Classification Search ......... 359/649–700, 359/811–824, 830
See application file for complete search history.

(56) References Cited

U.S. PATENT DOCUMENTS 7,534,063 B2 * 5/2009 Lin .......................... 401/265
7,612,954 B2 * 11/2009 Lin .......................... 359/819

* cited by examiner

*Primary Examiner*—Mohammed Hasan
(74) *Attorney, Agent, or Firm*—Raymond J. Chew

(57) ABSTRACT

An exemplary lens module includes a barrel and a first lens. The barrel includes a cylindrical sidewall. The sidewall defines an accommodating space therein and has an opening defined therein. The opening communicates with the accommodating space. The first lens is received in the accommodating space of the barrel. The first lens has a first adjusting notch defined at a periphery thereof. The first adjusting notch is exposed at the opening of the barrel.

11 Claims, 4 Drawing Sheets

LENS MODULE

BACKGROUND

1. Technical Field

The present disclosure relates to optical imaging and, particularly, to a lens module.

2. Description of Related Art

Generally, a lens module includes a barrel and a plurality of optical elements (e.g., lenses, and infrared-cut filters) received in the barrel. In assembly, the optical elements are assembled into the barrel. Sometimes, an eccentricity may occur in the assembled lens module and causes the assembled lens module unsatisfactory. Accordingly, the imaging quality of the assembled lens module fails to reach a set standard.

Therefore, a new lens module is desired to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will now be described in detail below with reference to the drawings.

Figure 1:
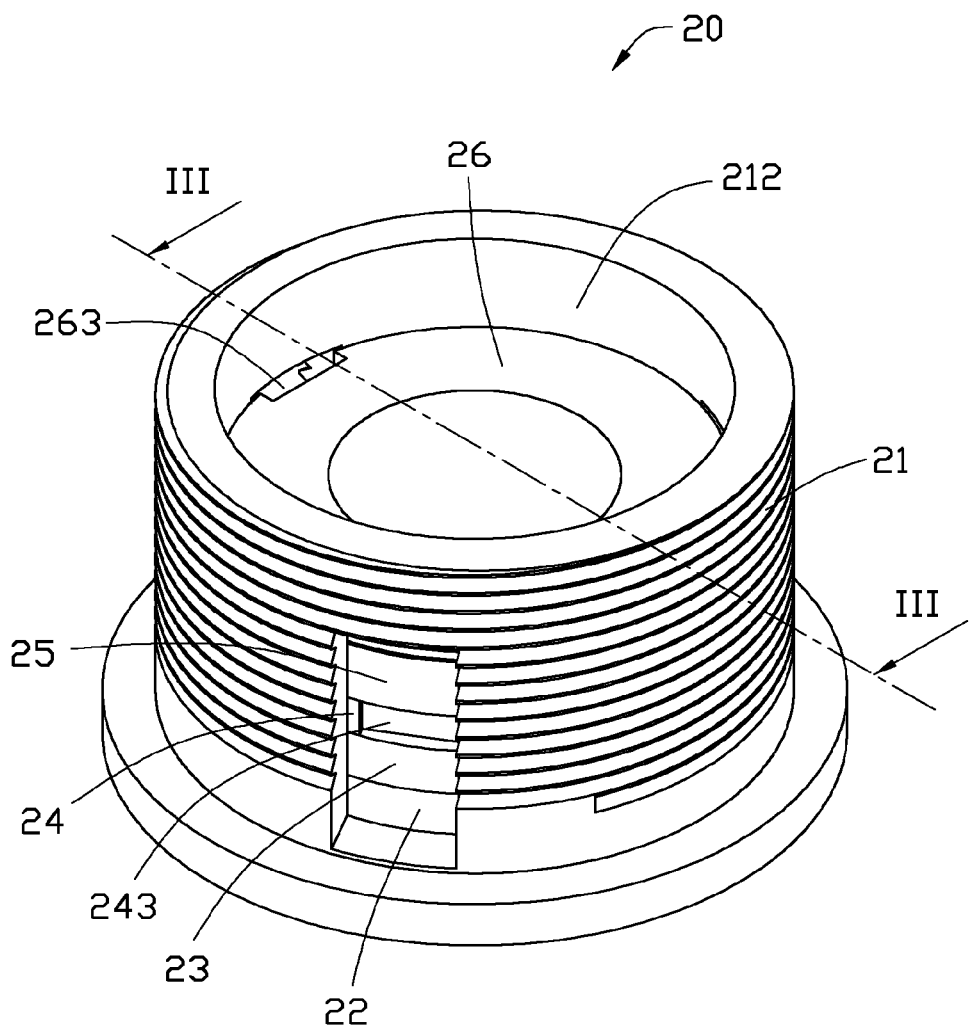
FIG. 1 is a perspective view of a lens module according to a first embodiment.
Figure 2:
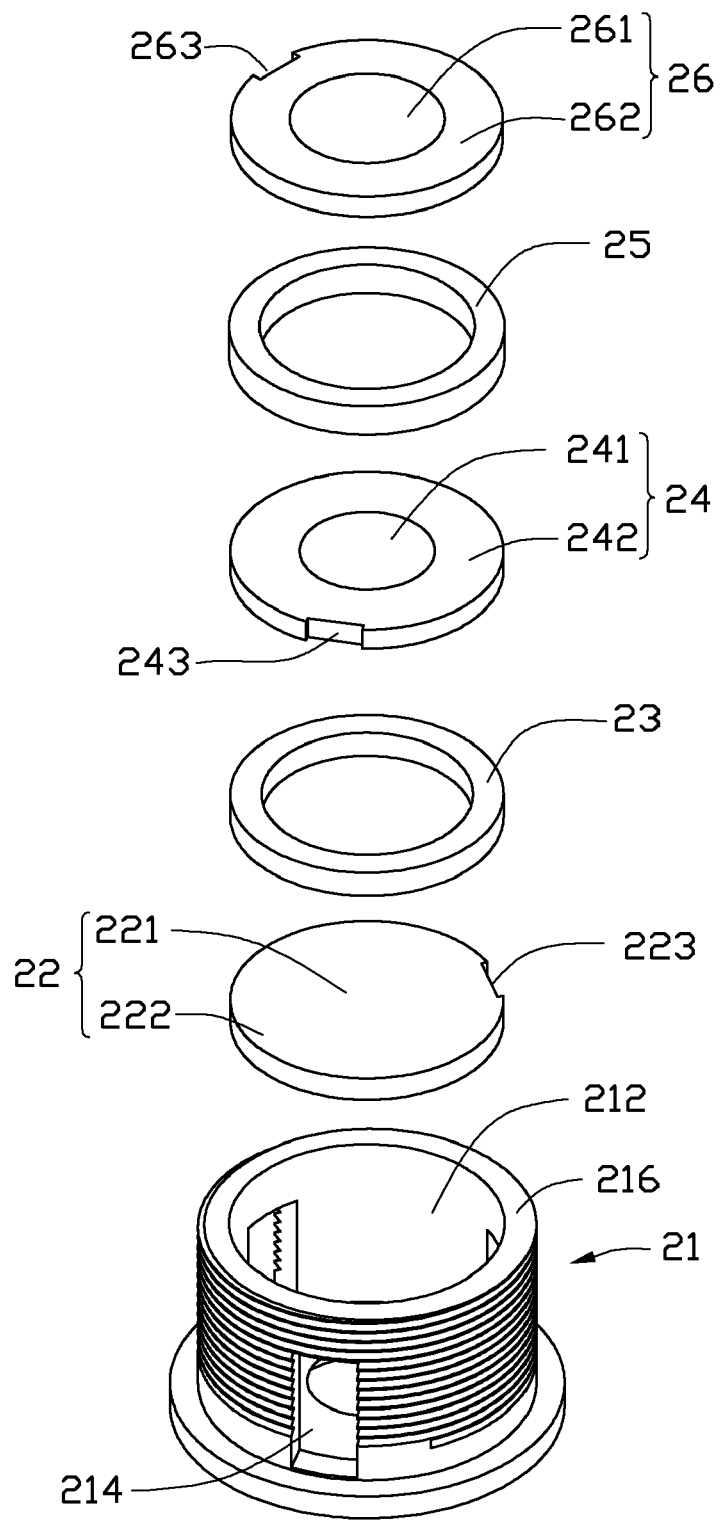
FIG. 2 is an exploded perspective view of the lens module of FIG. 1.
Figure 3:
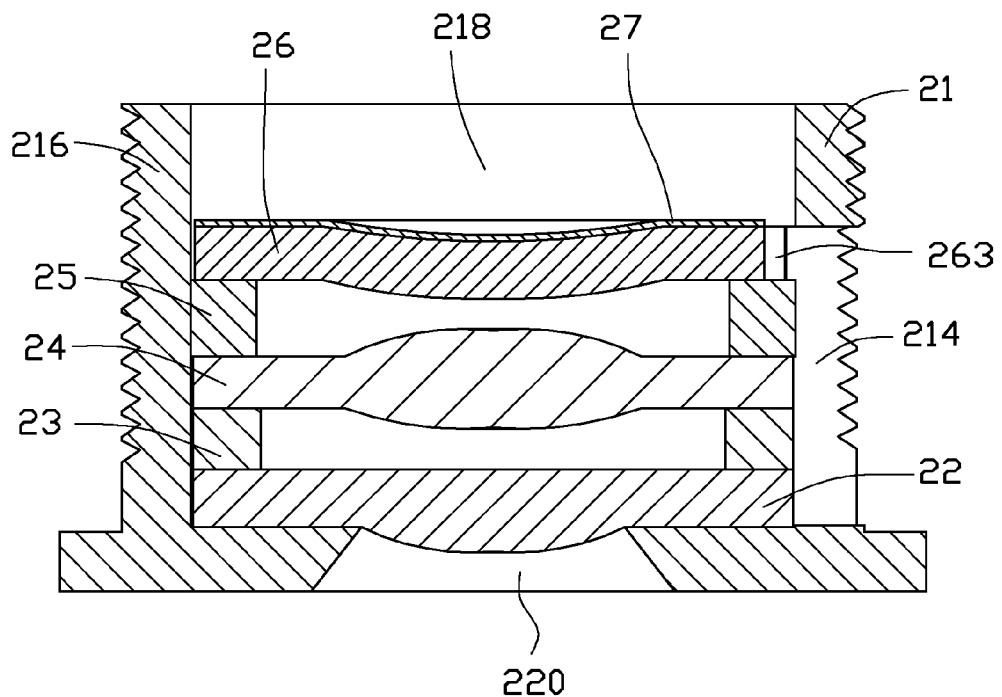
FIG. 3 is a sectional view of the lens module of FIG. 1 taken along the line III-III thereof.

Referring to FIGS. 1-3, a lens module 20 according to a first embodiment is shown. The lens module 20 includes a barrel 21, a first lens 22, a spacer 23, a second lens 24, a spacer 25, and a third lens 26. The barrel 21 includes a cylindrical sidewall 216, an accommodating space 212, and three openings 214 defined in the sidewall 216. The barrel 21 defines a top through hole 218 at a first end thereof and a bottom through hole 220 at an opposite second end thereof. The first lens 22, the spacer 23, the second lens 24, the spacer 25, and the third lens 26 are received in the accommodating space 212 from an object side to an image side in the order written.

In the present embodiment, each of the openings 214 is stripe-shaped extending in a direction parallel to a central axis of the barrel 21.

The first lens 22 includes a central optically active part 221 and a peripheral optically inactive part 222 surrounding the active part 221. The inactive part 222 defines a first adjusting notch 223 at a periphery thereof. The first adjusting notch 223 is arc-shaped and extends along the circumference of the first lens 22.

Similar to the first lens 22, the second lens 24 includes an optically active part 241, an optically inactive part 242, and a second adjusting notch 243 defined at a periphery thereof. The second adjusting notch 243 is arc-shaped and extends along the circumference of the second lens 24.

Similar to the first lens 22, the third lens 26 includes an optically active part 261, an optically inactive part 262, and a third adjusting notch 263 defined at a periphery thereof. Different from the first lens 22, the third lens 26 further includes an infrared-cut film 27 formed thereon. The third adjusting notch 263 is arc-shaped and extends along the circumference of the third lens 26.

In the present embodiment, the first adjusting notch 223, the second adjusting notch 243, and the third adjusting notch 263 communicate with and are exposed at a corresponding opening 214. A length of each opening 214 in a direction parallel to the central axis of the barrel 21 is equal to a total thickness of the first lens 22, the spacer 23, the second lens 24, the spacer 25, and the third lens 26.

It should be noted that in alternative embodiments, the barrel 21 can include only one opening 214 defined in the sidewall 216, and the first adjusting notch 223, the second adjusting notch 243 and the third adjusting notch 263 communicate with the same opening 214.

A method for making the lens module 20 is also provided as follows.

First, the first lens 22, the spacer 23, the second lens 24, the spacer 25 and the third lens 26 are assembled into the barrel 21 sequentially in such a manner that the first adjusting notch 223, the second adjusting notch 243, and the third adjusting notch 263 each communicate with a corresponding opening 214.

Second, the lens module 20 is measured to check whether an eccentricity exists. If the eccentricity exists, a tool such as a rod or other stick-like implement (not shown) is inserted into an adjusting notch of a lens (e.g., the first adjusting notch 223 of the first lens 22) via the opening 214 to drive the lens (e.g., the first lens 22) to rotate clockwise or counterclockwise until the eccentricity is reduced or eliminated. In this way, the eccentricity of the lens module 20 can usually be corrected.

Third, an adhesive can be applied to the lens (e.g., the first lens 22) to securely fix the lens (e.g., the first lens 22) with the barrel 21.

When an eccentricity occurs in the lens module 20, the eccentricity is probably reduced or eliminated using the above method due to the configuration of the lens module 20 (e.g., the openings 214 in the barrel 21 and the first adjusting notch 223 in the first lens 22). Accordingly, an imaging quality of the lens module 20 is greatly enhanced.

Figure 4:
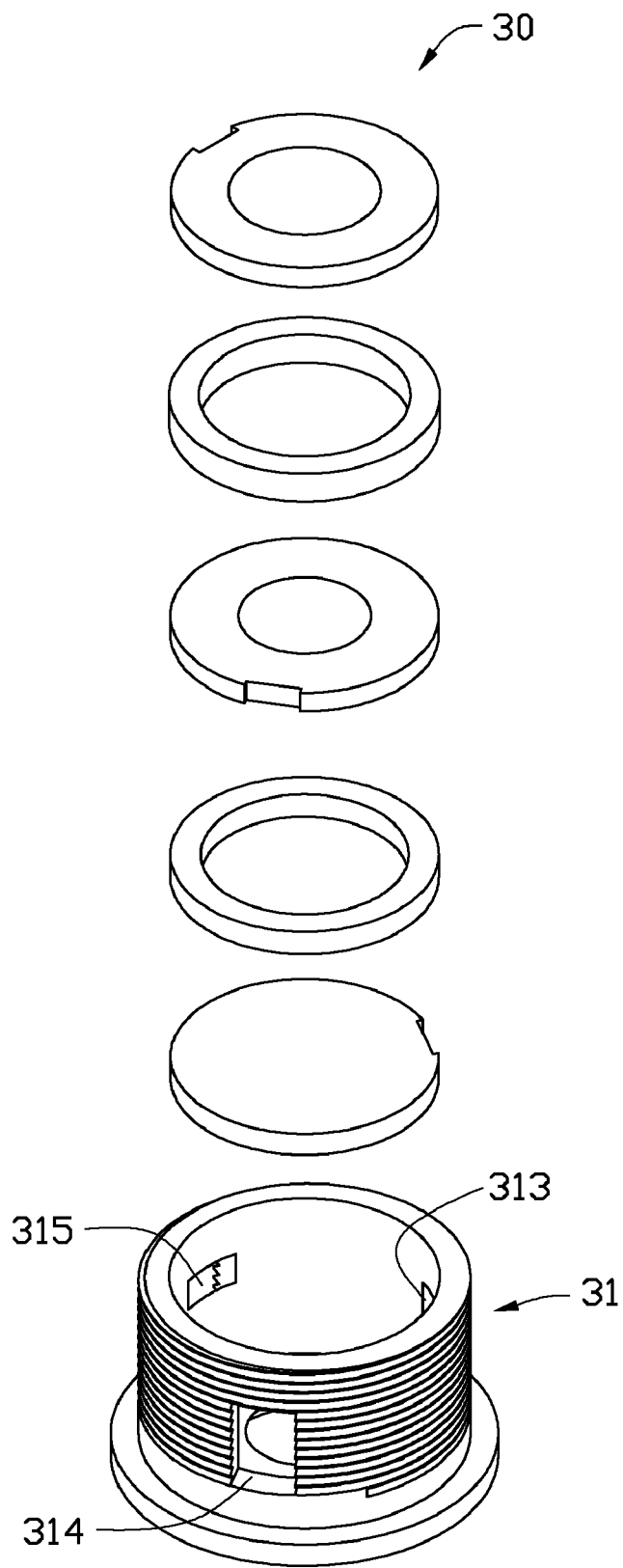
FIG. 4 is an exploded perspective view of a lens module according to a second embodiment.

Referring to FIG. 4, a lens module 30 according to a second embodiment is shown. The lens module 30 is similar to the lens module 20, except that the lens module 30 includes a barrel 31 having three openings 313, 314, 315 with different lengths in a direction parallel to a central axis of the barrel 31. The opening 313 has the largest length of the three openings 313, 314 and 315, while the opening 315 has the smallest length.

While certain embodiments have been described and exemplified above, various other embodiments from the foregoing disclosure will be apparent to those skilled in the art. The present disclosure is not limited to the particular embodiments described and exemplified but is capable of considerable variation and modification without departure from the scope and spirit of the appended claims.

What is claimed is:

1. A lens module comprising:
   a barrel comprising a cylindrical sidewall, the barrel defining a top through hole at one end thereof and a bottom through hole at another end thereof, the sidewall defining an accommodating space therein and having an opening defined therein, the opening communicating with the accommodating space; and
   a first lens received in the accommodating space of the barrel, the first lens having a first adjusting notch defined at a periphery thereof, the first adjusting notch exposed at the opening.

2. The lens module of claim 1, wherein the first lens comprises a central optically active part and a peripheral optically active part surrounding the optically active part, and the first adjusting notch is defined in the periphery of the optically inactive part.

3. The lens module of claim 1, further comprising a second lens received in the accommodating space of the barrel, the second lens having a second adjusting notch defined at a periphery thereof, the second adjusting notch exposed at the opening.

4. The lens module of claim 1, wherein the first lens comprises an infrared-cut film.

5. The lens module of claim 1, wherein the opening is stripe-shaped extending in a direction parallel to a central axis of the barrel.

6. The lens module of claim 1, wherein the first adjusting notch is arc-shaped and extends along the circumference of the first lens.

7. A lens module comprising:
 a barrel comprising a cylindrical sidewall, the barrel defining a top through hole at one end thereof and a bottom through hole at another end thereof, the sidewall defining an accommodating space therein and having a plurality of openings defined therein, the plurality of openings each communicating with the accommodating space; and
 a plurality of lenses received in the accommodating space of the barrel, each lens having an adjusting notch defined at a periphery thereof, each adjusting notch exposed at a respective opening.

8. The lens module of claim 7, wherein the plurality of openings have the same length in a direction parallel to a central axis of the barrel.

9. The lens module of claim 7, wherein the plurality of openings have different lengths in a direction parallel to a central axis of the barrel.

10. The lens module of claim 7, wherein each opening is stripe-shaped extending in a direction parallel to a central axis of the barrel.

11. The lens module of claim 7, wherein each adjusting notch is arc-shaped and extends along the circumference of the respective lens.

* * * * *